(12) United States Patent
Mäkelä

(10) Patent No.: US 7,643,934 B2
(45) Date of Patent: Jan. 5, 2010

(54) METHOD AND CONTROL SYSTEM FOR POSITIONING A MINE VEHICLE

(75) Inventor: Hannu Mäkelä, Helsinki (FI)

(73) Assignee: Sandvik Mining and Construction Oy, Tampere (FI)

( * ) Notice: Subject to any disclaimer, the term of this patent is extended or adjusted under 35 U.S.C. 154(b) by 420 days.

(21) Appl. No.: 10/550,606

(22) PCT Filed: Mar. 25, 2004

(86) PCT No.: PCT/FI2004/000172

§ 371 (c)(1),
(2), (4) Date: Sep. 23, 2005

(87) PCT Pub. No.: WO2004/085968

PCT Pub. Date: Oct. 7, 2004

(65) Prior Publication Data

US 2006/0235609 A1    Oct. 19, 2006

(30) Foreign Application Priority Data

Mar. 25, 2003   (FI) .................................. 20030440

(51) Int. Cl.
G01C 21/00     (2006.01)
(52) U.S. Cl. .................. 701/201; 701/300; 340/903
(58) Field of Classification Search ................ 701/205, 701/200–202, 207, 300, 301; 348/119; 340/903, 340/992
See application file for complete search history.

(56) References Cited

U.S. PATENT DOCUMENTS

| | | | |
|---|---|---|---|
| 3,735,103 A | 5/1973 | Finley | |
| 3,741,473 A | 6/1973 | Finley | |
| 4,250,403 A * | 2/1981 | Nomura et al. ................ | 377/24 |
| 5,477,220 A | 12/1995 | Ishikawa | |
| 5,796,613 A * | 8/1998 | Kato et al. .................. | 701/214 |
| 5,890,092 A | 3/1999 | Kato et al. | |
| 5,911,767 A * | 6/1999 | Garibotto et al. .............. | 701/28 |
| 6,061,627 A * | 5/2000 | Sato ........................... | 701/207 |
| 6,349,249 B1 * | 2/2002 | Cunningham ................ | 701/28 |
| 6,349,260 B1 | 2/2002 | de Jong | |
| 6,948,576 B2 * | 9/2005 | Angeles ....................... | 180/23 |
| 2004/0138799 A1 | 7/2004 | Makela et al. | |

FOREIGN PATENT DOCUMENTS

| | | |
|---|---|---|
| DE | 26 04 711 | 8/1977 |
| EP | 1 087 209 | 3/2001 |
| EP | 1 357 363 | 10/2003 |
| GB | 2 117 516 | 10/1983 |
| SE | 469 672 | 8/1993 |

OTHER PUBLICATIONS

European Office Action mailed Mar. 31, 2009 issued in European Application No. 04 723 226.9.

* cited by examiner

*Primary Examiner*—Gertrude Arthur Jeanglaud
(74) *Attorney, Agent, or Firm*—Drinker Biddle & Reath LLP

(57) ABSTRACT

A method and a control system for positioning a mine vehicle. Measurement of a distance travelled by the mine vehicle is based on monitoring rotation of a wheel. In the invention, an error caused in the distance measurement by wear of the wheel is compensated for automatically when the distance value obtained from monitoring is corrected by a correction factor. The value of the correction factor is updated at predetermined intervals during use.

13 Claims, 2 Drawing Sheets

METHOD AND CONTROL SYSTEM FOR POSITIONING A MINE VEHICLE

FIELD OF THE INVENTION

The invention relates to a method of determining a distance travelled by a mine vehicle provided with positioning, the mine vehicle comprising: a chassis; several wheels; an engine; power transmission for transmitting a torque from the engine to at least one wheel; and a control system including at least a first control unit arranged in the vehicle; and means for determining the distance travelled; and the method comprising: monitoring rotation of at least one wheel and calculating the length of the distance travelled in the control system on the basis of the monitoring result and the diameter of the wheel monitored.

The invention further relates to a control system of a mine vehicle, comprising at least: a first control unit, means for monitoring rotation of at least one wheel of the mine vehicle; the control system being arranged to determine a distance travelled by the vehicle on the basis of the rotation and diameter of the wheel.

BACKGROUND OF THE INVENTION

Unmanned mine vehicles can be guided in a mine along a desired route as long as the distance travelled by the vehicle and its driving direction can be determined. The vehicle direction can be found out with sufficient accuracy by means of a gyroscope, for example. The distance travelled can be calculated in the vehicle's control system after rotation data has first been measured directly from a vehicle wheel by suitable sensors, or indirectly from the power transmission or engine. The determination of the distance on the basis of the wheel rotation involves the problem that the diameter of tires changes as they wear. Thus the real distance travelled by the vehicle and the distance determined by measuring may clearly differ from each other. Deviations in the distance determination decrease the location accuracy of the mine vehicle and make it more difficult for the vehicle to stay on the planned route.

BRIEF DESCRIPTION OF THE INVENTION

The object of the invention is to provide a novel and improved arrangement for locating a mine vehicle which automatically takes account of the wear of vehicle tires in the distance measurement based on wheel rotation.

The method according to the invention is characterized by determining a correction factor, which changes in relation to a change in the wheel diameter; correcting the value of the distance travelled obtained by calculating by means of the correction factor; and updating the value of the correction factor at predetermined intervals.

The control system according to the invention is characterized in that the control system is arranged to automatically correct the result of distance measurement by a correction factor, and that the value of the correction factor is arranged to be updated at predetermined intervals, and thus the trend in the wheel diameter change is taken into account.

The idea underlying the invention is that the control system of a mine vehicle automatically compensates for a deviation caused by the wear of tires in the distance measurement. For compensation, the control system defines a correction factor, by which the result of the distance measurement is multiplied. The value of the correction factor is updated at predetermined intervals during the use of the mine vehicle. The value of the correction factor is updated according to the trend in the wear degree change of tires.

An advantage of the invention is that the control system automatically takes the wear of tires into account in positioning, in which case the distance measurement and consequently the positioning accuracy of the vehicle are independent of the condition of the tires. A further advantage is that the system requires no separate sensors and measuring means for determining the wheel diameter.

The underlying idea of an embodiment according to the invention is that the compensation utilizes a positioning check performed at predetermined intervals, where the real position of the vehicle is determined first, the real position is compared to the route stored in the control system, and on the basis of these, the magnitude of the correction needed in the vehicle's travel direction is determined. The control system further includes a counter where the values obtained for the corrections in the travel direction can be added up. When the vehicle travels a predetermined distance, several correction values are added to the counter during this period. Based on the ratio between the magnitude of the correction value added to the counter and the distance travelled during the reference period, a correction factor is calculated, which can be updated to a new correction factor after the reference period for manipulating the result obtained from the distance measurement. A new correction factor is formed again during the next reference period.

The idea underlying an embodiment of the invention is that a mine vehicle is taught a desired route by driving, which is stored in the control system as an electronic map. Profile information obtained from the route by scanners or corresponding measuring devices is also stored in the electronic route map. This way an environmental model of the route is formed where topographic information on the mine tunnel may be stored, for example. During the automatic drive of a mine vehicle, positioning is checked substantially continuously by scanning the surroundings of the vehicle and by comparing the environmental data obtained to the environmental model in the control system. On the basis of the differences between the measurement and the model, the real position of the vehicle can be found out and the correction need in the vehicle's driving direction determined at each moment the positioning is checked. The correction in the driving direction is used for forming a new correction factor.

The idea underlying an embodiment of the invention is that the control system updates the value of the correction factor by taking into account only a predetermined portion of the new correction factor value determined on the basis of the positioning check when forming a new correction factor. The portion to be taken into account may be 0.1%, for instance. An advantage of this embodiment is that any inaccuracies in the measurement performed during a single reference period, such as wheel skidding, have no critical influence on the result. The arrangement reduces the effect of single deviations but takes the trend in the wear of the tires into account.

The idea underlying an embodiment of the invention is that at least two reference points, which the control system of the mine vehicle is arranged to recognize, have been determined for the mine in advance. The control system knows the exact distance between the reference points, i.e. the reference distance. When the vehicle travels along the route, the control system measures the distance between the reference points. The measurement result is compared to the reference distance to obtain a correction factor. The value of the correction factor can be updated each time the vehicle drives past the reference points.

The idea underlying an embodiment of the invention is that the value of the correction factor is updated by taking into account the average wheel-specific reduction rate of the diameter determined statistically from the moment when the wheel was adopted to the removal moment of the wheel.

The idea underlying an embodiment of the invention is that the mine vehicle is provided with a data transmission connection, by means of which a first control unit provided in the mine vehicle can communicate with a second control unit external to the vehicle. Mine vehicle of this kind may be unmanned.

BRIEF DESCRIPTION OF FIGURES

The invention will be described in greater detail in the accompanying drawings, in which FIG. 1 schematically illustrates a mine vehicle according to the invention.

For the sake of clarity, the figures show the invention in a simplified manner. Like reference numbers identify like elements.

DETAILED DESCRIPTION OF THE INVENTION

Figure 1:
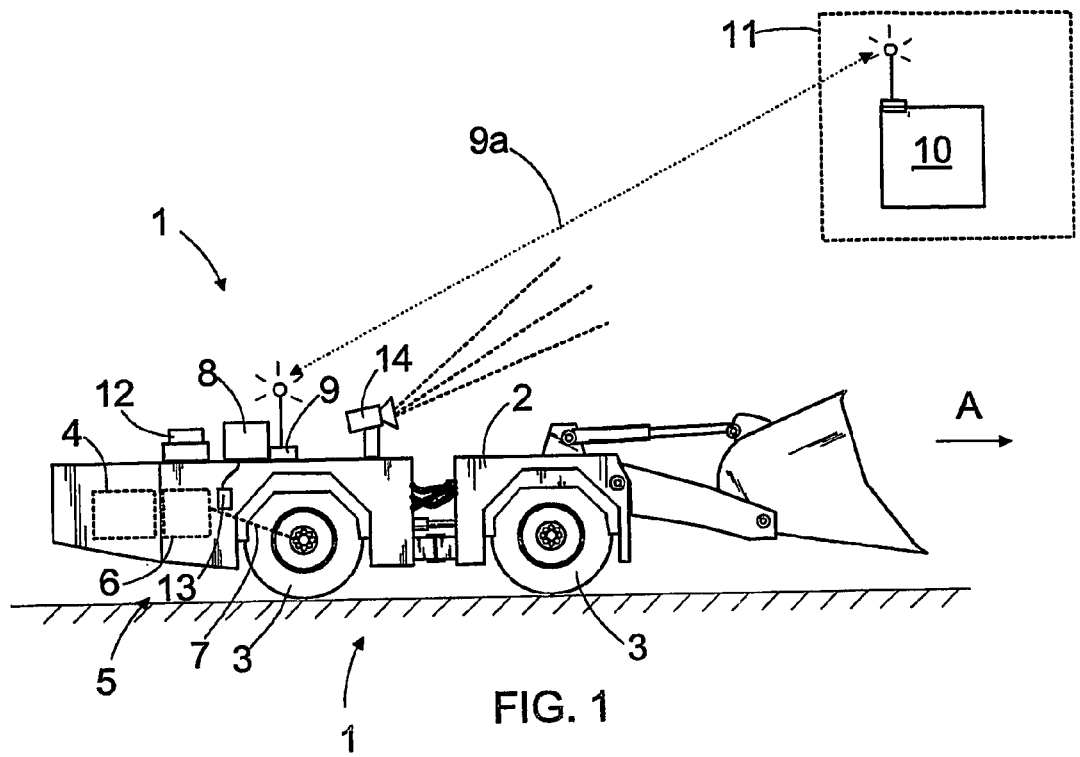
Figure 4:
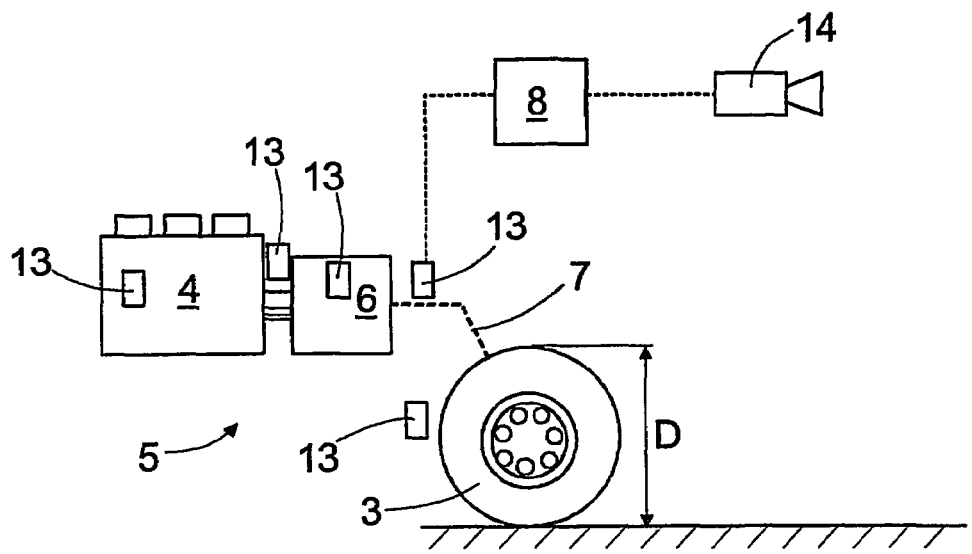

FIG. 1 illustrates a mine vehicle 1, which in this case is a loading vehicle, whose front part is provided with a bucket for transporting and loading quarried material. Alternatively, the mine vehicle 1 may be a rock drilling rig or a transport vehicle provided with a platform, for instance. The mine vehicle 1 comprises a movable chassis 2, which is provided with several wheels 3, of which at least one is a drive wheel driven by an engine 4 through power transmission 5. The engine 4 may be an electric motor, a combustion engine, a hydraulic motor or any other device for providing a torque. The power transmission 5 typically comprises a gear system 6 and needed cardan shafts 7, differential gear and other power transmission members for transmitting the torque from the engine 4 to the drive wheels. In addition, the mine vehicle 1 is provided with a control system, which comprises at least a first control unit 8, which is arranged to control the actuators provided in the mine vehicle 1 for steering and operating it. Furthermore, the mine vehicle 1 may comprise a data transmission unit 9, by means of which the first control unit 8 may establish a data transmission connection 9a to a second control unit 10 external to the mine vehicle 1. The second control unit 10 may be located in a control room 11, which may be outside the mine. The control units 8 and 10 may be computers or similar devices. In addition, the control system of the mine vehicle 1 may include at least one gyroscope 12 for determining the direction of the vehicle accurately for positioning. Furthermore, the control system includes means for determining the distance travelled by the mine vehicle 1. FIG. 4 illustrates a system suitable for distance measurement where the rotation of a wheel 3 is measured by one or more sensors 13. Based on the measurement data, the control system determines the rotation movement of the wheel and then calculates the length of the distance travelled by the vehicle. In addition, the control system may include one or more scanners 14, for example a laser scanner or a similar device for determining the space surrounding the mine vehicle 1 and its profiles. The positioning of the vehicle can be checked at certain intervals by comparing the environmental data scanned at the reference points and an environmental model of the stored route 16.

Figure 2:
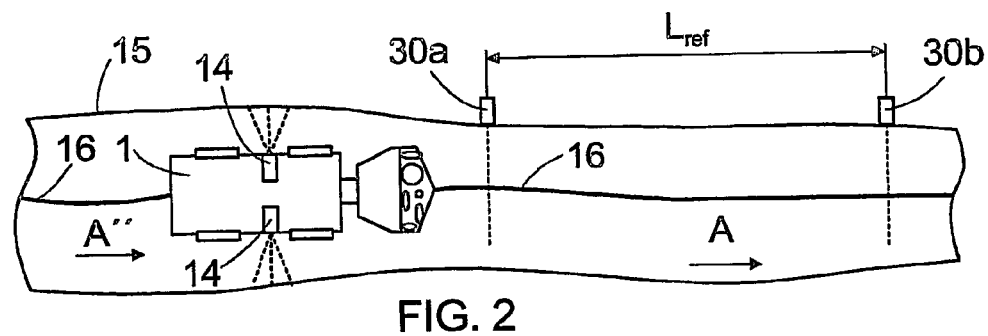
FIG. 2 illustrates a schematic top view of an arrangement for ensuring positioning of a mine vehicle, FIG. 3 schematically illustrates an arrangement for ensuring positioning of a mine vehicle seen in the longitudinal direction of the vehicle, FIG. 4 schematically illustrates an arrangement according to the invention for measuring the distance travelled by the mine vehicle, and FIG. 5 schematically illustrates a deviation of the mine vehicle from a planned route as X and Y coordinates of the control system and a correction in the driving direction determined by the control system so that the vehicle can resume the route.
Figure 3:
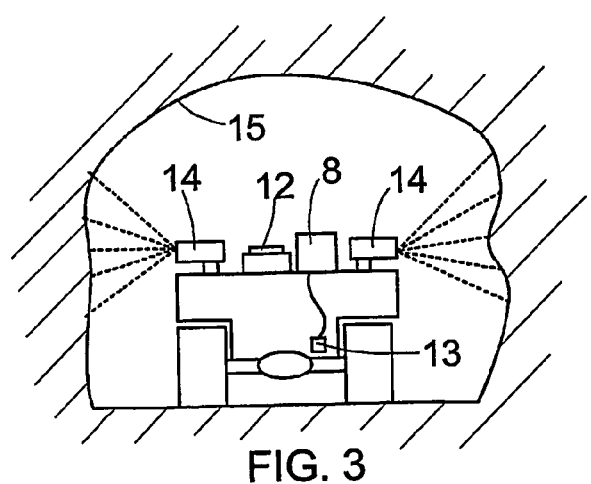

FIGS. 2 and 3 illustrate the principle of scanning used in checking the positioning. One or both sides of the vehicle 1 may be provided with laser scanners 14 for determining the profile and topography of a mine tunnel 15.

The route 16 of the mine vehicle 1 can be formed by teaching. In that case, the vehicle is driven by manual control along a desired route and simultaneously, the directions and distances of the route 16 are stored in the control system as an electronic map. The space surrounding the vehicle is also scanned during the teaching drive and the scanning result is stored in the control system as a three-dimensional environmental model showing the surface profile of the route travelled by the vehicle. During the production drive, the mine vehicle may be unmanned while the control system takes care of steering. The surroundings of the vehicle are scanned also during the automatic drive. The result from scanning is compared to the three dimensional environmental model stored in the control system, which enables positioning the real position of the mine vehicle in relation to the predetermined route of the vehicle. If, according to the comparison, the mine vehicle is not on the desired route, the control system forms correction values, by means of which the vehicle can be brought back to the correct route.

FIG. 4 illustrates a way of measuring the distance travelled by the mine vehicle 1. The engine drives one or more wheels 3 through power transmission 5. The information on the rotation movement of a vehicle wheel needed to determine the distance is obtained by means of one or more sensors 13. The sensor 13 may be arranged to directly monitor the wheel 3. Alternatively, the sensor 13 may be arranged to monitor the rotation movement of the wheel indirectly by monitoring the rotation movements of the power transmission 5 or engine 4. The rotation movement of the wheel 3 can be calculated in the control system when the transmission ratios are known. On the basis of the rotation movement and diameter of the wheel 3, the control unit 8 can calculate the length of the distance travelled by the vehicle. During the use, however, the wheel 3 diameter D decreases due to wear, and thus there is a difference between the measured distance and the real distance travelled, which can be compensated for by taking a correction factor into account in the measurement result. The correction factor can he updated at certain intervals, for example each time a certain predetermined distance has been travelled. Thus the value of the correction factor follows the trend in the wear of the tire.

Figure 5:
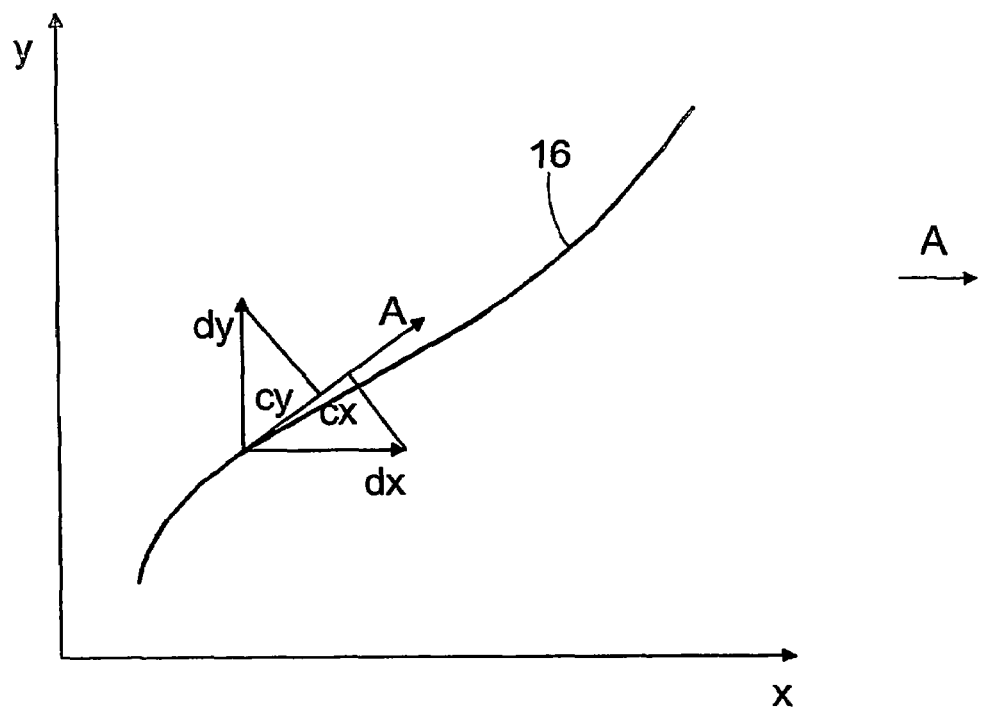

FIG. 5 illustrates a working area defined for the control system as X and Y coordinates. The route to be driven is marked with reference number 16 and the driving direction of the mine vehicle at the moment to be examined with arrow A. The scanning results are compared with the environmental model in the control unit and the need for correcting positioning is determined. A correction in direction X is marked in the figure with reference symbol dx and a correction in direction Y with reference symbol dy. Based on the correction needs in the X and Y directions, the magnitude of the correction need in driving direction A can be calculated using basic trigonometry. When the sum of correction needs formed during a certain distance is proportioned to the distance travelled, a correction factor is obtained for correcting the distance measurement to correspond to the changed wheel diameter. This arrangement also takes into consideration any surprising changes in the wheel, such as premature wear or detachment of the wear surface. In addition, it takes account of the fact how much the wheel has compressed, i.e. what is the effective wheel diameter. Thus the filling degree of an air filled wheel does not substantially affect the accuracy of the distance measurement.

It should be mentioned that instead of scanning, the positioning can be checked by another method. The mine may be provided with reference members at predetermined checkpoints for determining the real position of the vehicle. The reference members may be reflectors, for example, on which a laser beam provided in the vehicle is focused for determining the distance. Furthermore, the mine and/or the vehicle may be provided with radio, light or sound transmitters, which enable accurate determination of the position of the mine vehicle.

When the tires of the mine vehicle have worn out and they are replaced, the diameter of the new tires is supplied to the control system of the mine vehicle. The tire diameter can be fed manually into the control system or, alternatively, the diameter can be read automatically from identifiers provided in the tires, for instance. At the same time, the value of the correction factor can be set to correspond to the wheel.

Furthermore, the value of the correction factor can be updated by determining, for example as shown in FIG. 2, an exact reference distance $L_{ref}$ for the mine, the length of this distance being known to the control system. For this purpose, a first reference point 30a and a second reference point 30b, which may be laser transmitters, for example, may be arranged on the route of the mine vehicle 1. The sensor provided in the mine vehicle 1 is arranged to recognize the beam transmitted by the transmitters. When the control system travels the reference distance $L_{ref}$ between the reference points 30a, 30b, it also measures this distance. For updating the correction factor, the control system compares the measured distance to the reference distance.

In addition, the value of the correction factor may be arranged to be updated by statistically determining an average wear rate for each tire type. Since the normal wear of tires follows a certain trend, it can be found out empirically how long a distance can be driven on average using a certain tire type in certain circumstances until the tire is worn out and has to be replaced. The diameter of a new tire is known as well as that of a worn tire. Based on this information, it can be determined relatively accurately how much the wheel diameter changes in relation to the distance travelled. The correction factor can then be updated linearly in relation to the distance driven. For noticing any surprising phenomena in the wheel, the wheel can be provided with a wear detector, for example, which gives an alarm if the wearing deviates from normal.

The method according to the invention can be performed by executing a computer program in the processor of a computer belonging to the control system. The computer program implementing the method according to the invention can be stored in the memory of the control system, or the program can be loaded into the computer from a memory means, such as a CD-ROM. In addition, the computer program can be loaded from another computer via a data network to the computer belonging to the control system of the mine vehicle.

The drawings and the related description are only intended to illustrate the inventive concept. The details of the invention may vary within the scope of the claims.

The invention claimed is:

1. A method of determining a distance travelled by an underground mine vehicle provided with positioning, the mine vehicle comprising: a chassis; several wheels; an engine; power transmission for transmitting a torque from the engine to at least one wheel; and a control system including at least a first control unit arranged in the vehicle; and monitoring rotation of at least one wheel and calculating a length of the distance travelled in the control system on the basis of a monitoring result and diameter of the wheel monitored;

and the method comprising:

determining a correction factor based upon a trend in a change in the wheel diameter;

correcting a value of the distance travelled obtained by calculating by way of the correction factor, and updating the value of the correction factor at predetermined intervals.

2. A method according to claim 1, comprising performing a check on the vehicle positioning at predetermined intervals, comprising determining the real position of the vehicle, and determining a deviation between the real position of the vehicle and a planned route, determining a correction in the driving direction of the vehicle corresponding to the deviation, adding distance corrections in a driving direction that have come up during a predetermined reference period to a counter in the control system, and updating the correction factor on the basis of the ratio between the length of the distance measured during the reference period and the correction value added to the counter during the reference period.

3. A method according to claim 1, comprising teaching the planned route of the vehicle to the control system in advance and storing an environmental model of topographical wall surface profiles surrounding the planned route in the control system, monitoring environmental data on profiles of the wall surfaces surrounding the vehicle during use, performing a positioning check by comparing the monitored environmental data to the environmental model stored in the control system, determining a real position of the vehicle on the basis of the comparison, determining the deviation from the planned route and calculating a distance correction in the driving direction of the vehicle.

4. A method according to claim 1, comprising taking account only a portion of a new correction factor determined on a basis of the positioning check when forming the new correction factor, whereby an effect of single deviations are reduced but the trend in the wear of tires is taken into account.

5. A method according to claim 1, comprising transmitting data related to the control system of the mine vehicle between the first control unit and a second control unit external to the mine vehicle.

6. A control system for an underground mine vehicle, comprising:

a first control unit, and wherein the control system being arranged to determine a distance travelled by the vehicle on basis of a monitoring rotation of at least one wheel of the mine vehicle and diameter of the wheel monitored, the control system is arranged to automatically correct a result from the distance measurement by a correction factor, and a value of the correction factor is arranged to be updated at predetermined intervals, and thus a trend in a change of the wheel diameter is taken into account.

7. A control system according to claim 6, wherein
the control system is arranged to check positioning of the vehicle at predetermined intervals and to determine a correction proposal for positioning in a driving direction of the vehicle,
the control system includes a counter, which is arranged to add up correction proposals during a predetermined reference period,
and the control arrangement is arranged to determine a correction factor value on basis of a ratio between a length of a distance measured during the reference period and the correction value added to the counter during the reference period.

8. A control system according to claim 6, wherein
an electronic environmental model of topographical wall surface profiles surrounding the planned route is stored in the control system,
the control system is arranged to form electronic environmental data on basis of topographical surface profiles of space surrounding the mine vehicle,
and the control system is arranged to check positioning of the vehicle by comparing environmental data to an environmental model.

9. A control system according to claim 6, wherein the control system comprises at least one laser scanner for checking positioning of the vehicle.

10. A control system according to claim 6, wherein the control system comprises a data transmission unit, by means of which a first control unit is arranged to communicate with at least a second control unit external to the mine vehicle.

11. A method of determining a distance travelled by an underground mine vehicle provided with positioning,
the mine vehicle comprising: a chassis; several wheels; an engine; power transmission for transmitting a torque from the engine to at least one wheel; and a control system including at least a first control unit arranged in the vehicle; and
monitoring rotation of at least one wheel and calculating a length of the distance travelled in the control system on the basis of a monitoring result and diameter of the wheel monitored;
and the method comprising:
determining a correction factor, the correction factor changing in relation to a change in the wheel diameter;
correcting a value of the distance travelled obtained by calculating by way of the correction factor;
updating the value of the correction factor at predetermined intervals;
storing an environmental model of topographical surface wall profiles surrounding the planned route in the control system;
monitoring environmental data on profiles of the wall surfaces surrounding the vehicle during use;
performing a positioning check by comparing the monitored environmental data to the environmental model stored in the control system; and
determining a real position of the vehicle on the basis of the comparison, determining the deviation from the planned route and calculating a distance correction in the driving direction of the vehicle.

12. A control system for an underground mine vehicle, comprising:
a first control unit,
and wherein the control system being arranged to determine a distance travelled by the vehicle on basis of a monitoring rotation of at least one wheel of the mine vehicle and diameter of the wheel monitored,
the control system is arranged to automatically correct a result from the distance measurement by a correction factor,
and a value of the correction factor is arranged to be updated at predetermined intervals, and thus a trend in a change of the wheel diameter is taken into account,
wherein an electronic environmental model of topographical wall surface profiles surrounding the planned route is stored in the control system,
the control system is arranged to form electronic environmental data on basis of topographical surface profiles of space surrounding the mine vehicle,
and the control system is arranged to check positioning of the vehicle by comparing environmental data to an environmental model.

13. A method of determining a distance travelled by an underground mine vehicle provided with positioning,
the mine vehicle comprising: a chassis; several wheels; an engine; power transmission for transmitting a torque from the engine to at least one wheel; and a control system including at least a first control unit arranged in the vehicle; and
monitoring rotation of at least one wheel and calculating a length of the distance travelled in the control system on the basis of a monitoring result and diameter of the wheel monitored;
and the method comprising:
determining a correction factor, the correction factor changing in relation to a change in the wheel diameter;
correcting a value of the distance travelled obtained by calculating by way of the correction factor,
and updating the value of the correction factor at predetermined intervals;
recognizing at least two reference points in the mine the distance between these reference points being known by the control system,
measuring the distance between the at least two reference points,
comparing the measurement result of the distance to the predetermined reference distance for obtaining a correction factor,
and updating the correction factor when driving past the reference points.

* * * * *